E. GLICK.
NOSE RING.
APPLICATION FILED MAY 28, 1921.
1,424,563.
Patented Aug. 1, 1922.
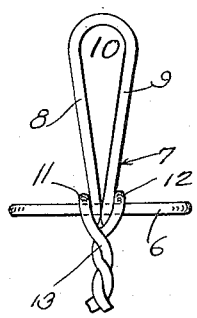
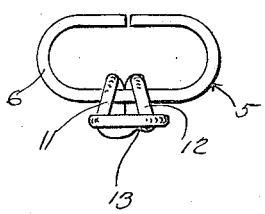
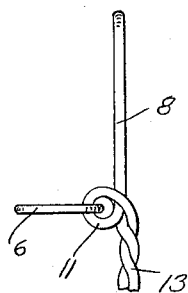
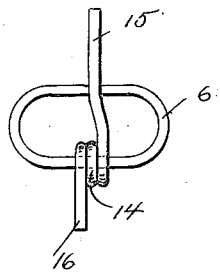
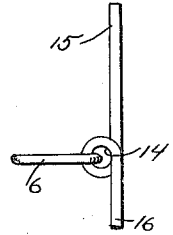
Inventor
E. Glick.
By Watson E. Coleman
Attorney

UNITED STATES PATENT OFFICE.

ENOS GLICK, OF PARIS, ILLINOIS.

NOSE RING.

1,424,583.            Specification of Letters Patent.      Patented Aug. 1, 1922.

Application filed May 28, 1921. Serial No. 473,334.

*To all whom it may concern:*

Be it known that I, ENOS GLICK, a citizen of the United States, residing at Paris, in the county of Edgar and State of Illinois, have invented certain new and useful Improvements in Nose Rings, of which the following is a specification, reference being had to the accompanying drawings.

This invention relates to nose rings, and particularly to nose rings for live stock.

It is an object of the invention to provide a ring of this character which may be readily applied and which does not at any time cause injury to the live stock.

It is another object of the invention to provide a ring of this character adapted to engage the snout of an animal and wherein a movable member is carried by the ring to prevent the animal from rooting or lifting the wires of a fence, but which does not interfere with the animal when eating.

It is also an object of the invention to provide a ring of this character wherein the bar carried by the ring is not only laterally movable with respect to the snout of the animal, but which is also arranged for oscillating movement so that the only time the bar comes into use is when the animal engages an object such as a fence or endeavors to root up the ground.

It is a further object of the invention to provide a ring of this character formed from two lengths of wire, one length of wire forming the ring, while the other length of wire is substantially coiled at its intermediate portion to provide an eye for the reception of the ring.

With these and other objects in view, the invention consists in the improved construction and arrangement of parts to be hereinafter more particularly described, fully claimed and illustrated in the accompanying drawings, in which:

Figure 1 is a front elevation of a nose ring constructed in accordance with an embodiment of the invention, Figure 2 is a top plan view of the structure shown in Figure 1, Figure 3 is a side elevation of the structure shown in Figure 1, Figure 4 is a front elevation of another form of nose ring, and Figure 5 is a side elevation of the structure shown in Figure 4.

Referring to the drawings, 5 designates a length of material, preferably wire, which is bent or extended to form a ring 6, the end portions of which are adapted to be inserted in the snout of an animal. This ring is intended to remain immovable in the snout of the animal so as not to cause discomfort or injury.

In order to permit the hog to eat without experiencing discomfort from the nose ring, or when moving the snout over the ground or an object, and at the same time to prevent the hog from lifting the fence wires or rooting up the ground, there is provided, a novel form of spur or restraining rod 7, which similar to the ring 5 is formed from a single length of material, preferably wire. The length is bent at its intermediate portion to provide substantially parallel arms 8 and 9 and also to form a loop 10. Each of the arms 8 and 9 is bent to form coils 11 and 12, the coils of each arm being disposed on the outer side of the arm. The coils cooperate to form a bearing or passage for the reception of the ring 6. It will be noted that the diameter of the coils 11 and 12 is greater than the diameter of the wire used in the formation of the ring. This is to permit unobstructed movement of the spur on the ring. The end portions of the arms 8 and 9 after the formation of the coils are extended substantially in alignment with the loop, and are twisted one upon the other as at 13, the twisted portion of the arms substantially corresponding in length to the length of the loop 10.

In Figures 4 and 5 another form of the spur is shown. This form consists of a length of material which is coiled several times at its intermediate portion to provide a bearing 14 for the reception of the ring 6, the end portions 15 and 16 of said length being extended in opposite directions and in offset relation to each other.

The spur is placed upon the ring 6 and the ring positioned in the snout of the animal. In view of the freedom of movement of the spur, it is not necessary that the ring 6 should move, so that injury to the animal, or irritation to the snout of the animal, is eliminated. At the same time, should the animal endeavor to raise the wires of a fence or root up the ground, this movement of the snout of the animal will cause one end of the spur to come in contact with the object or ground, and force the opposite end of the spur into the snout of the animal. This operation is the same for both forms of the spur. Another important feature is that when the animal is eating, the spur being loosely mounted on the ring, is permitted to adjust itself to the movement of the snout of the animal so that the spur is only brought into use in cases of emergency, and all these features are possessed by a ring that is simple in construction and in view of which it may be formed from a small amount of material.

What is claimed is:

1. A nose ring for live stock comprising a ring adapted to engage the snout of the animal, a length of material coiled several times at its central portion to provide a spur bar, said spur bar being movable on the ring, the end portions of said spur bar extending in opposite directions in offset relation in the same plane.

2. A nose ring for live stock comprising a ring adapted to engage the animal's snout, and a spur bar consisting of a length of resilient wire having several spiral coils formed adjacent its central portion, the end portions of said length extending from the coils in opposite directions substantially in the same plane, said coils providing a sleeve for the reception of a portion of the ring and to limit lateral movement of the spur bar.

3. A nose ring for live stock comprising a ring adapted to engage the animal's snout, and a spur bar consisting of a length of resilient wire having its central portion coiled several times around the ring to hold said bar substantially in a vertical position, the end portions of said length extending from the coils in opposite directions substantially in the same plane, the diameter of the sleeve being greater than the diameter of the portion of the ring disposed in the sleeve and of a length to permit sliding and oscillating movement of the spur bar on the ring.

In testimony whereof I hereunto affix my signature.

ENOS GLICK.